(12) United States Patent
Ikonen et al.

(10) Patent No.: US 8,150,927 B2
(45) Date of Patent: Apr. 3, 2012

(54) PROCESSING OF MESSAGES TO BE TRANSMITTED OVER COMMUNICATION NETWORKS

(76) Inventors: Teemu Ikonen, Espoo (FI); Juha Koponen, Helsinki (FI); Janne Kalliola, Espoo (FI)

( * ) Notice: Subject to any disclaimer, the term of this patent is extended or adjusted under 35 U.S.C. 154(b) by 228 days.

(21) Appl. No.: 11/719,515

(22) PCT Filed: Nov. 18, 2005

(86) PCT No.: PCT/FI2005/050421
§ 371 (c)(1),
(2), (4) Date: Sep. 18, 2007

(87) PCT Pub. No.: WO2006/053950
PCT Pub. Date: May 26, 2006

(65) Prior Publication Data
US 2008/0189373 A1 Aug. 7, 2008

(30) Foreign Application Priority Data
Nov. 22, 2004 (FI) .................................... 20041499

(51) Int. Cl.
*G06F 15/17* (2006.01)
(52) U.S. Cl. ........................ 709/206; 709/207
(58) Field of Classification Search .............. 709/206
See application file for complete search history.

(56) References Cited

U.S. PATENT DOCUMENTS

| | | | |
|---|---|---|---|
| 5,999,967 A * | 12/1999 | Sundsted | 709/206 |
| 6,772,196 B1 | 8/2004 | Kirsch et al. | |
| 7,054,905 B1 * | 5/2006 | Hanna et al. | 709/206 |
| 2003/0051054 A1 | 3/2003 | Redlich et al. | |
| 2003/0208546 A1 * | 11/2003 | DeSalvo et al. | 709/206 |
| 2004/0064515 A1 | 4/2004 | Hockey | |
| 2004/0186894 A1 * | 9/2004 | Jhingan et al. | 709/207 |
| 2009/0144382 A1 * | 6/2009 | Benninghoff, III | 709/206 |

FOREIGN PATENT DOCUMENTS

| | | |
|---|---|---|
| FI | 113516 B | 12/2003 |
| WO | 2004/081734 B1 | 9/2004 |
| WO | WO 2004/084112 A1 | 9/2004 |

\* cited by examiner

*Primary Examiner* — Kenny Lin
*Assistant Examiner* — Sulaiman Nooristany
(74) *Attorney, Agent, or Firm* — Shalom Wertsberger; Saltamar Innovations

(57) ABSTRACT

The invention relates to processing, at a transmitting entity, messages to be transferred between a transmitting entity and a receiving entity. The method comprises: obtaining a message to be transferred to the receiving entity, defining a substantially unique identifier at least for one part of the message to be transferred, conditionally replacing said part of the message to be transferred with said substantially unique identifier, and forwarding the message for transfer to the receiving entity. Further the invention relates to processing, at a receiving entity, messages transferred between a transmitting entity and a receiving entity The method comprises: receiving a message transferred from the transmitting entity, the message comprising a substantially unique identifier as a substitute of a part of the message, and retrieving said substituted part of the message on the basis of said substantially unique identifier.

10 Claims, 7 Drawing Sheets

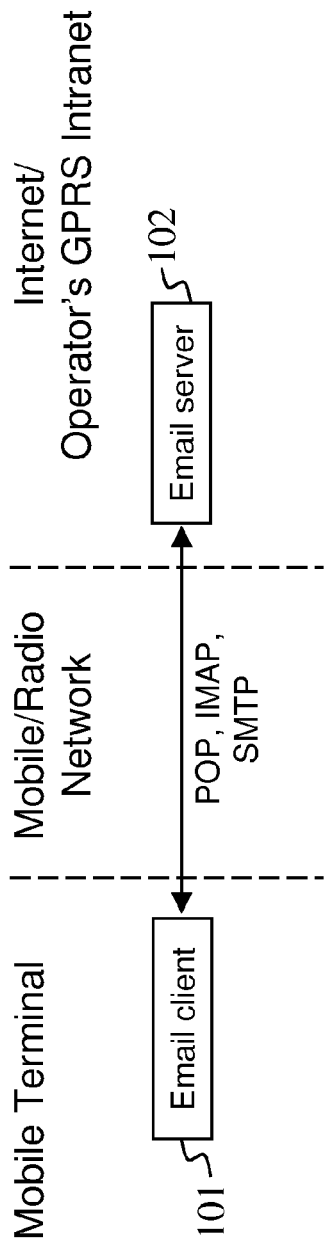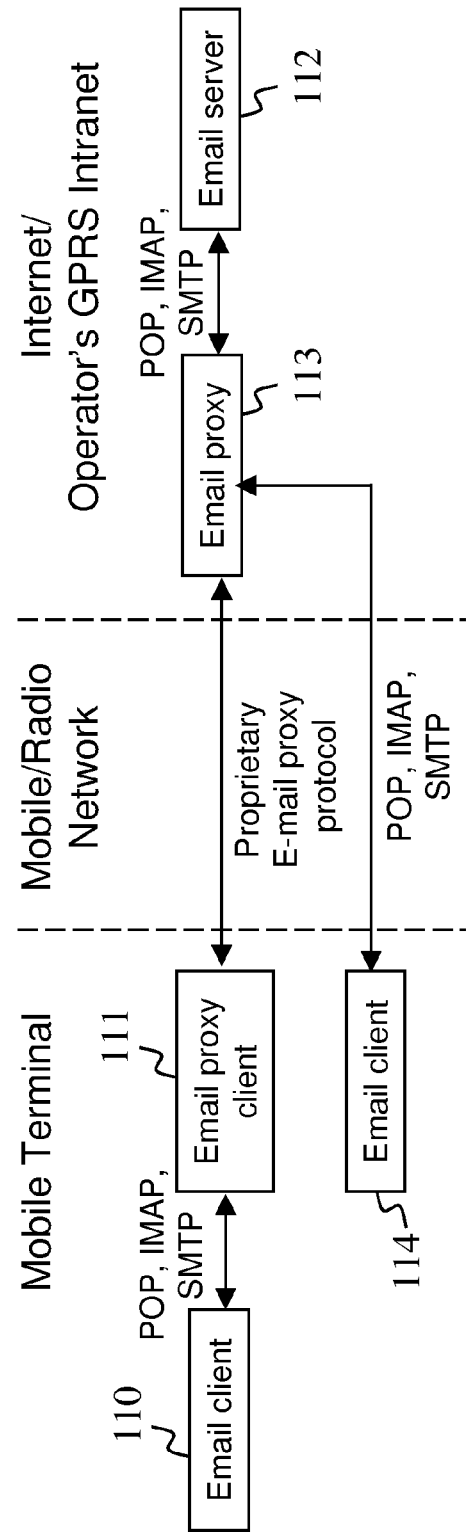

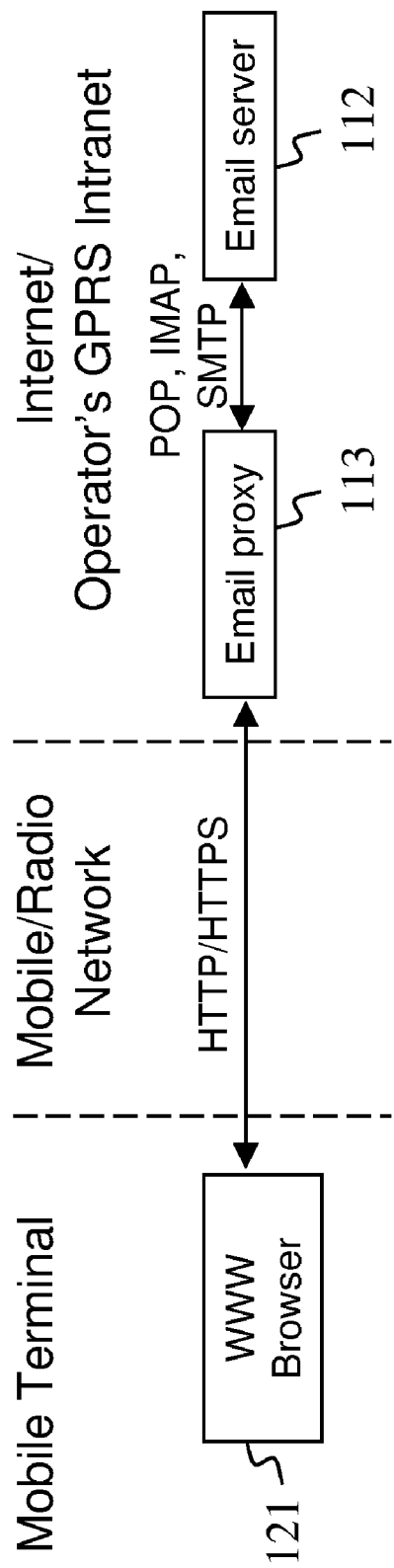

PROCESSING OF MESSAGES TO BE TRANSMITTED OVER COMMUNICATION NETWORKS

FIELD OF THE INVENTION

The invention relates to processing of messages that are to be transmitted over communication networks and particularly to such processing of e-mails.

BACKGROUND OF THE INVENTION

E-mail traffic is one of the rapidly growing applications in mobile/radio communication networks. E-mails are downloaded to laptops or mobile terminals or other radio/wireless communication devices through mobile communication networks.

Because available bandwidth is typically limited in mobile communication networks, handling of large e-mails and/or e-mails with attachments (for example over 20 kB) often leads to poor user experience due to long periods of time needed for downloading and sending e-mails. Furthermore, the user is often billed according to the amount of transferred data. Therefore it would be beneficial for the user to be able to minimise the amount of data that is transferred.

For these reasons methods of reducing the amount of transferred data have been developed.

In the following, terminology that is used for describing such methods is briefly discussed. This terminology will be adhered to in the rest of this document.

Lossless data processing: it is possible to revert to the original data on the basis of the processed data; no information is lost.

Lossy data processing: it is not possible to revert to the original data as a whole on the basis of the processed data; at least part of the information is lost.

Compression: lossless method, in which information is stored in fewer bits than the length of the original information.

Optimisation: lossy method, in which some parts of the original information are removed for reducing the size of the information.

Downgrading: reducing quality of the information for reducing its size.

Manipulation: removing or replacing parts of the original information for reducing its size.

Hashing: transformation of a string of characters into a shorter string that substantially uniquely identifies the original string.

Hash (value): value or key substantially uniquely identifying a longer string of characters. (Depending on the hash function different character strings may obtain the same hash value, but in most hash applications such collision is highly improbable and does not cause any practical problems.)

Differentiation: a change listing; calculation of differences between first and second versions of a file so that the second file can be obtained by combining the first file and the difference and the first file can be obtained by extracting the difference from the second file.

Low bandwidth network: a network in which there is one or more slow speed links along the path between a terminal and a server. Herein slow means that the link causes (significant) delays to the message transfer, that is, the message content size divided by the link speed is so large that the user perceives link slowness. Thus this definition does not specify the link speed in quantitative terms; instead the network bandwidth may be arbitrary high in case the content size is comparatively high.

Currently optimisation is used only for downloading e-mails, whereas in sending of e-mails only compression is currently used. Compression may be, and often is, used also for downloading e-mails in addition to (or instead of) optimisation.

FIGS. 1A-1C show diagrams illustrating different e-mail setups in mobile networks. All setups are shown in a system comprising a mobile terminal that is connected to Internet/operator's GPRS (General Packet Radio Service) intranet via a mobile/radio network.

FIG. 1A shows a basic setup, wherein the mobile terminal comprises an e-mail client 101 and Internet/operator's GPRS network comprises an e-mail server 102. The e-mail client 101 in the mobile terminal and the e-mail server 102 in the Internet/operator's GPRS intranet may communicate by using POP (Post Office Protocol), IMAP (Internet Message Access Protocol) or SMTP (Simple Mail Transfer Protocol) protocols, which are commonly known e-mail protocols. In this basic setup, there are no measures for accelerating e-mail transfer over the mobile/radio network.

FIG. 1B shows an optimised setup. Herein the Internet/operator's GPRS intranet comprises an e-mail server 112 and an (optimising) e-mail proxy 113 that is connected to the e-mail server 112 and communicates with the e-mail server by using POP, IMAP or SMTP protocol.

Two alternative setups are shown for the mobile terminal. In the first one the mobile terminal comprises an e-mail client 110 and an e-mail proxy client 111 that is connected to the e-mail server 112 and communicates with the e-mail server by using POP, IMAP or SMTP protocol. The e-mail proxy 113 and the e-mail proxy client 111 communicate with each other over the mobile/radio network by using a proprietary e-mail proxy protocol, which protocol is configured to optimise the transfer of e-mails to the e-mail proxy client. The e-mail proxy 113 compresses e-mail messages and the e-mail proxy client 111 decompresses them in the mobile terminal and provides them onwards to the e-mail client 110. In addition to this, the e-mail proxy 113 may optimise the emails to be downloaded by removing attachments from the e-mails or replacing them with HTTP URIs (HyperTexts Transfer Protocol, Uniform Resource Identifier) for allowing the user of the mobile terminal to download the attachments later.

E-mails are sent from the mobile terminal through the e-mail proxy client. The e-mail proxy client compresses the messages and sends them (in compressed form) to the e-mail proxy, which decompresses them and sends them onwards to the email server in decompressed form.

In the second mobile terminal setup the mobile terminal comprises only an e-mail client 114. Herein, the e-mail client 114 communicates directly with the e-mail proxy 113 by using POP, IMAP or SMTP protocol.

FIG. 1C shows a web interface setup. Herein, the setup of the Internet/operator's GPRS intranet corresponds to the setup of FIG. 1B. The mobile terminal comprises a www browser, which communicates with the e-mail proxy 113 in Internet/operator's GPRS intranet over a HTTP (HyperText Transfer Protocol) or HTTPS (Secure HTTP) connection. The user of the mobile terminal reads e-mails through a web interface. The user can decide which e-mails and/or which attachments are downloaded. That is, the user can decide to read only interesting messages and to download only required attachments. Thus, there is no need to download everything.

The disadvantage of the currently used solutions is that sent e-mails are only compressed and not optimised. Further, the web interface that is needed for optimising e-mail downloads is not optimal. For example, the e-mail messages are not saved for offline use and a considerable amount of additional data needs to be sent for establishing the web interface (www pages, images etc.).

SUMMARY OF THE INVENTION

An object of the present invention is to provide a new solution for processing of messages that are to be transmitted between a transmitting entity and a receiving entity at least partially over communication networks.

One of the basic ideas of the invention is to replace parts of messages by substantially unique identifiers before transferring the messages over a communication network or a part of a communication network, wherein may be a mobile network or a fixed line network. Thereby the amount of data to be transferred over the communication network can be reduced. This substantially unique identifier can then be used for retrieving the omitted part of the message in the receiving end.

According to a first aspect of the invention, there is provided a method for processing messages to be transferred between a transmitting entity and a receiving entity at least partially over a communication network, wherein the method comprises:

obtaining, to the transmitting entity, a message to be transferred to the receiving entity,
defining a substantially unique identifier at least for one part of the message to be transferred,
conditionally replacing said part of the message to be transferred with said substantially unique identifier, and
forwarding the message for transfer to the receiving entity.

According to a second aspect of the invention, there is provided a method for processing messages transferred between a transmitting entity and a receiving entity at least partially over a communication network, wherein the method comprises:

receiving, at the receiving entity, a message transferred from the transmitting entity, the message comprising a substantially unique identifier as a substitute of a part of the message, and
retrieving said substituted part of the message on the basis of said substantially unique identifier.

According to a third aspect of the invention, there is provided a transmitting entity according to claim 22.

According to a fourth aspect of the invention, there is provided a receiving entity according to claim 23.

According to a second aspect of the invention, there is provided a system according to claim 24.

According to a second aspect of the invention, there is provided a computer program for a transmitting entity according to claim 27.

According to a second aspect of the invention, there is provided a computer program for a receiving entity according to claim 28.

Dependent claims contain embodiments of the invention. The subject matter contained in dependent claims relating to a particular aspect of the invention is also applicable to other aspects of the invention.

The invention suits well for accelerating e-mail transmission, but it can be used also in connection with transferring any other messages or content that can be divided into more than one part, such as messages comprising distinctive files and/or distinctively viewable content. Such other messages may be for example Multimedia Messaging Service (MMS) messages or other downloadable content such as mobile Java games. Further, in addition to optimising downloading of e-mails or other messages, the invention can be used for optimising sending of e-mails or other messages from a mobile terminal.

The methods of the invention may be used even though there would not be a specific need to accelerate the data transmission. For example, if the user is billed by the amount of transferred data, the user is most likely happy if the amount of transferred data is reduced.

A solution according to an embodiment of the invention provides extra benefits in situations, wherein the user receives the same e-mail, message or piece of content several times,
the user receives the same or very similar attachments several times,
the users forward attachments they have received from other messages, or
users forward e-mails, messages or content.

A solution according to another embodiment of the invention provides extra benefits in situations, wherein the user sends a slightly modified attachment or message that is based on an attachment or message downloaded earlier, or
the user receives a slightly modified attachment or message that is based on an attachment or message downloaded earlier.

BRIEF DESCRIPTION OF THE DRAWINGS

Embodiments of the invention will now be described by way of example with reference to the accompanying drawings in which:

FIG. 1A-1C show diagrams illustrating different e-mail setups in mobile networks shows;

DETAILED DESCRIPTION

Figure 2:
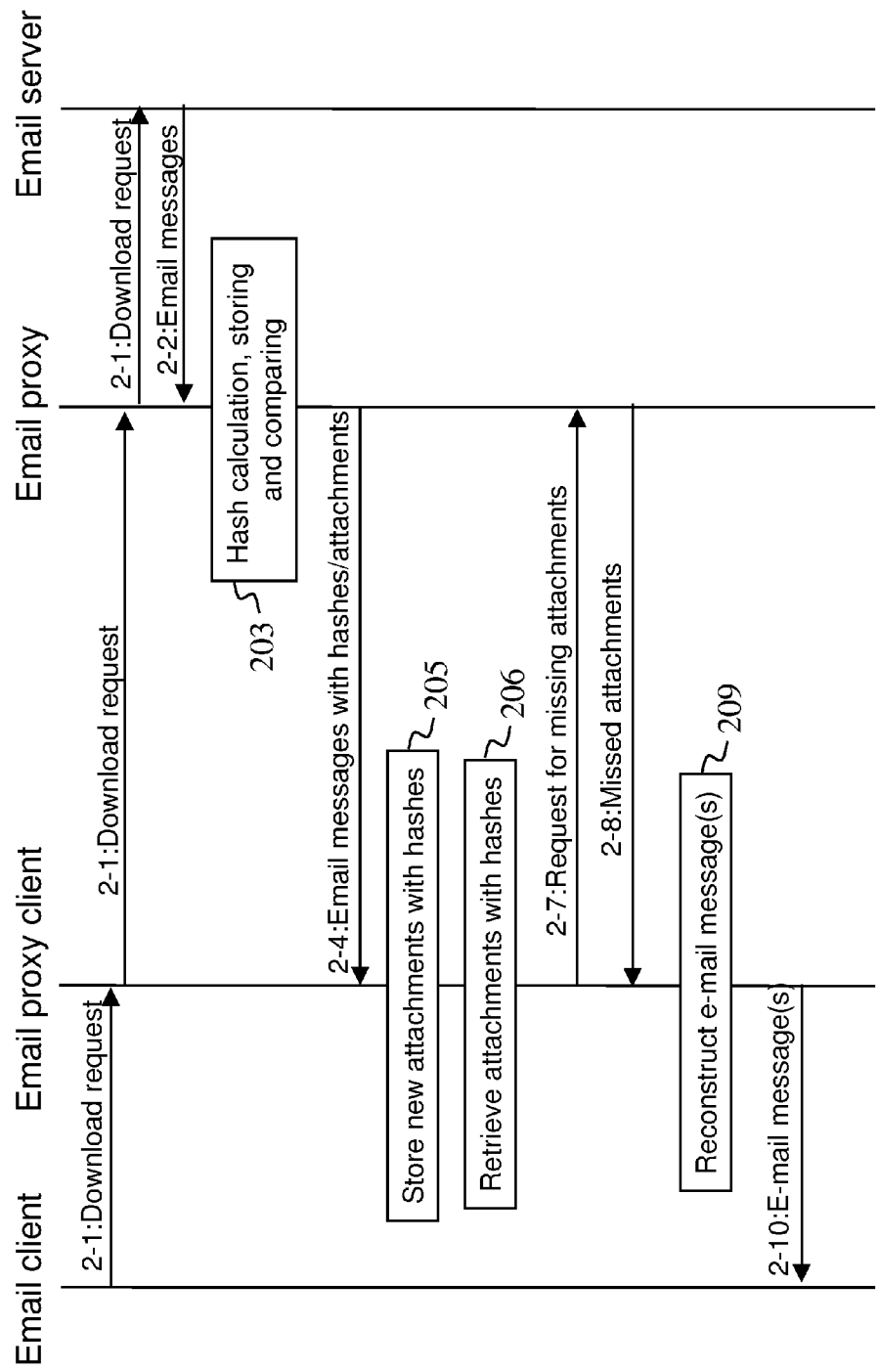
FIG. 2 shows a messaging diagram illustrating downloading e-mails according to an embodiment of the invention.

The functionality provided by the invention resides for example in any suitable location/system between any suitable receiving entity and transmitting entity. The receiving entity and transmitting entity may be for example an e-mail client and an e-mail server, respectively. Alternatively the receiving entity may be an e-mail server, while the transmitting entity is an e-mail client. Furthermore, instead of e-mail clients and servers the receiving and transmitting entities may be some other communicating parties, such as for example a mobile terminal and an MMSC (Multimedia Messaging Service Center).

In an embodiment of the invention the path between the receiving entity and the transmitting entity may comprise one or more slow speed links (a low bandwidth network). Herein slow means that the link causes (significant) delays to the message transfer, that is, the message content size divided by the link speed is large, for example over 20 seconds, and the user must wait for the content to be delivered. Nevertheless, the invention is not restricted only to such low bandwidth networks.

The implementation of the invention may be an e-mail proxy arrangement comprising an e-mail proxy in the network side and an e-mail proxy client residing in the user's device. That is, the setup may correspond to the setup shown in FIG. 1B, only the functionality of the e-mail proxy and the e-mail proxy client need to be modified according to the invention. Herein it must be noted that in connection with the invention the Internet/operator's intranet shown in FIG. 1B may be also some other network, such as for example a corporate LAN (Local Area Network) or some other setting.

However, also other implementations, which will be discussed below, are possible.

The optimisation provided by the invention is based on defining substantially unique identifiers, such as hash values, checksums calculated by means of for example cyclical checksum algorithm or differences in relation certain auxiliary data, for some parts of messages that are to be sent over a communication network. The auxiliary data may be for example a base attachment or a base message that is presumably available in the receiving end. Further, the auxiliary data may be selected such that it is at least partially similar with the message part relating to which the difference is calculated. In order to reduce the amount of data whose suitability for difference calculation is tested, the auxiliary data may be selected among a limited set of data, such as data stored in cache.

Still another alternative is to define the substantially unique identifier on the basis of name, size, type, time stamp, or specific information in the files, for example headers, file author, meta data described in a metadata identifier of the message part or on the basis of some suitable combination of these. The substantially unique identifier is such that it identifies a message part or content reasonably accurately. That is, there is no need to have 100% accuracy, if the identifier is accurate enough for the purposes of the application domain.

These substantially unique identifiers can be used to replace some parts of messages (for example e-mail or MMS messages) that the user of a mobile terminal is sending. This optimised message is then sent over the communication network, which may be for example a mobile network or some other low bandwidth network. After the message has been transferred the omitted parts of the message may be retrieved on the basis of the substantially unique identifiers and messages with contents corresponding to the original parts are forwarded to the recipients of the messages.

Nevertheless, it must be noted that according to the invention replacing the message parts with the substantially unique identifier is conditional. For example if the use of the substantially unique identifier would result in a larger amount of data than the original message part, then there may be no reason to conduct the replacing.

The parts of the message for which the substantially unique identifiers are defined may be for example MIME parts of MIME multipart message. (MIME multipart is specified in Network Working Group standard RFC 2387—The MIME Multi-part/Related Content-type, August 1998.)

The optimisation according to the invention can be used equally for optimising messages that are downloaded to mobile terminals or some other user devices. It must be noted that the invention may be used in connection with other optimisation mechanisms or on it's own.

According to an embodiment of the invention, the system is configured to select the parts of message, which are optimised (by means of a hash value or some other identifier), on the basis of the type or size of the parts of message. It is possible for example that parts that are smaller than certain size limit are not optimised. In an alternative setting, parts of a type, which can be easily compressed, are not optimised, whereas parts of a type, which cannot be significantly compressed, are optimised and then possibly compressed. As an example, text files can be easily compressed, but JPEG and MP3 files cannot be compressed significantly.

In the following, in connection with FIGS. 2-5, various details of the invention will be discussed in connection with a system comprising an e-mail client and an e-mail proxy client in a user's device and an e-mail proxy and an e-mail server in the fixed line network. The e-mail proxy client and the e-mail proxy communicate with each other at least partially over a communication network, which may be a network having limited bandwidth, such as a mobile network. In addition to e-mails, these examples may be adapted also to other types of messages.

FIG. 2 shows a messaging diagram illustrating downloading e-mails according to an embodiment of the invention.

First a download request 2-1 destined to the e-mail server is sent form the e-mail client. This request goes through the e-mail proxy client and the e-mail proxy. The e-mail server responds to the download request with the e-mail messages 2-2.

In step 203, the e-mail proxy calculates MD5 hash (or similar) for each attachment and stores them with reference to the original attachment. These hashes and respective references to the original documents are then maintained in the e-mail proxy for future use. The e-mail proxy also compares the calculated hash(es) to the ones that have been stored for the e-mail client or e-mail proxy client in question.

On the basis of this comparison, the e-mail proxy conditionally attaches the hashes to the e-mail messages before sending them to the e-mail proxy client.

If the hash is included in the stored hashes, the e-mail proxy may conclude that the respective attachment has already been sent to the client and therefore the e-mail proxy can replace the attachment with the hash.

If the hash is not included in the stored hashes the e-mail proxy may conclude that client does not have the respective attachment and therefore the e-mail proxy should send the original attachment with or without the hash.

In an alternative implementation the e-mail proxy is "lazy" and does not compare the calculated hash to the previous hashes but always replaces the attachments with respective hashes before sending the messages to the e-mail proxy client.

Then the e-mail proxy sends the message accompanied with attachments and related hashes 2-4 to the e-mail proxy client. In step 205, the e-mail proxy client stores new hashes (and optionally new attachments) received from the e-mail proxy. Then the e-mail proxy client retrieves the substituted attachments on the basis of the hashes in step 206.

If the client has the attachment, it retrieves it based on the hash (from client's own store or from e-mail program's store).

If the client does not have the attachment, it sends a request for missing attachments 2-7 to the e-mail proxy, which responds by sending the missing attachments 2-8.

Then the e-mail proxy client reconstructs the original e-mail message(s) on the basis of the retrieved attachments in step 209. After the reconstruction the email proxy client sends the reconstructed e-mail message(s) 2-10 to the e-mail client.

In an implementation according to an embodiment of the invention, the e-mail proxy and the e-mail proxy client communicate with each other by using a proprietary protocol. In that case, it is possible to embed the hashes or information about the hashes in packet headers of the proprietary protocol so that the receiving entity is able to identify in which messages some parts are replaced by hashes. Another option for notifying the receiving entity of the replaced message parts is to define a new MIME part. This new MIME part is used for replacing the omitted MIME part. The hash may be conveyed in the new MIME part or alternatively the hash may be included in the headers of the new MIME part, whereby the actual MIME part may be empty. Other substantially unique identifiers may be conveyed in the same way. A still further possibility is to include the information about replaced message parts into an HTTP header.

Figure 3:
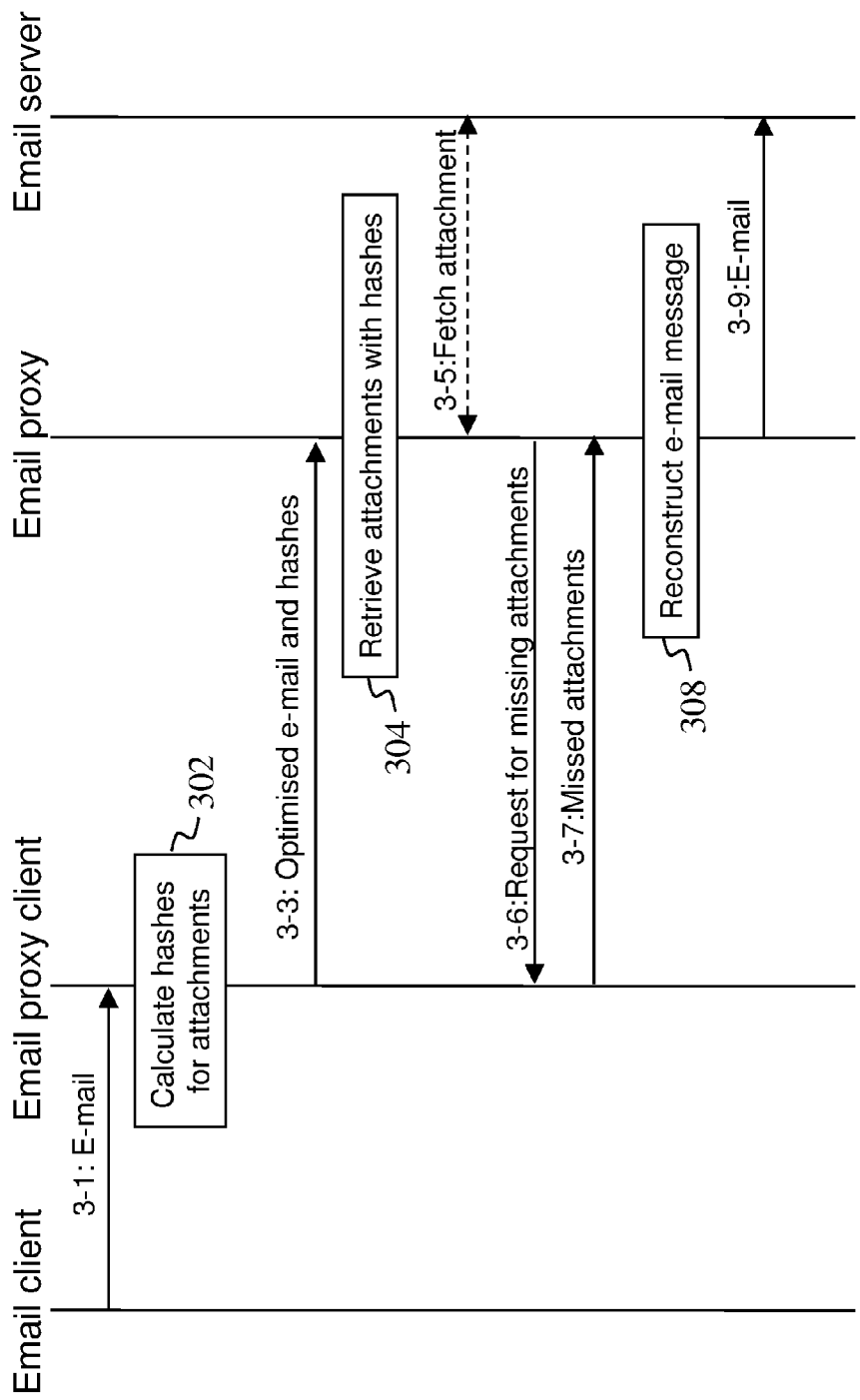
FIG. 3 shows a messaging diagram illustrating sending e-mails according to an embodiment of the invention.

FIG. 3 shows a messaging diagram illustrating sending e-mails according to an embodiment of the invention.

First an email message with attachments 3-1 is sent from the e-mail client. The e-mail proxy client residing in the user's device captures the e-mail and calculates MD5 hash (or similar) for each attachment and stores them with reference to the original attachment in step 302. These hashes and respective references to the original documents are then maintained in the e-mail proxy client for future use.

The e-mail proxy client may also compare the calculated hash(es) to the ones that have been stored before. On the basis of this comparing the e-mail proxy conditionally attaches the hashes to the e-mail messages before sending them onwards over the mobile network to the e-mail proxy.

If the hash is included in the stored hashes, the e-mail proxy may conclude that the respective attachment has already been sent to the client and therefore the e-mail proxy can replace the attachment with the hash.

If the hash is not included in the stored hashes the e-mail proxy may conclude that client does not have the respective attachment and therefore the e-mail proxy should send the original attachment with or without the hash.

In an alternative implementation the e-mail proxy client is "lazy" and does not compare the calculated hash to the previous hashes but always replaces the attachments with respective hashes before sending the messages to the e-mail proxy.

Then the e-mail proxy client sends the optimised message 3-3 possibly accompanied with attachments and related hashes to the e-mail proxy. In step 304, the e-mail proxy retrieves the substituted attachments on the basis of the hashes.

If the proxy has the attachment, it retrieves it based on the hash. Optionally the proxy may fetch the attachments 3-5 from the e-mail server.

If the proxy or the e-mail server does not have the attachment, it sends a request for missing attachments 3-6 to the e-mail proxy client, which responds by sending the missing attachments 3-7.

Then the e-mail proxy reconstructs the original e-mail message on the basis of the retrieved attachments in step 308. After the reconstruction the email proxy sends the reconstructed e-mail message 3-9 to the recipient.

Figure 4:
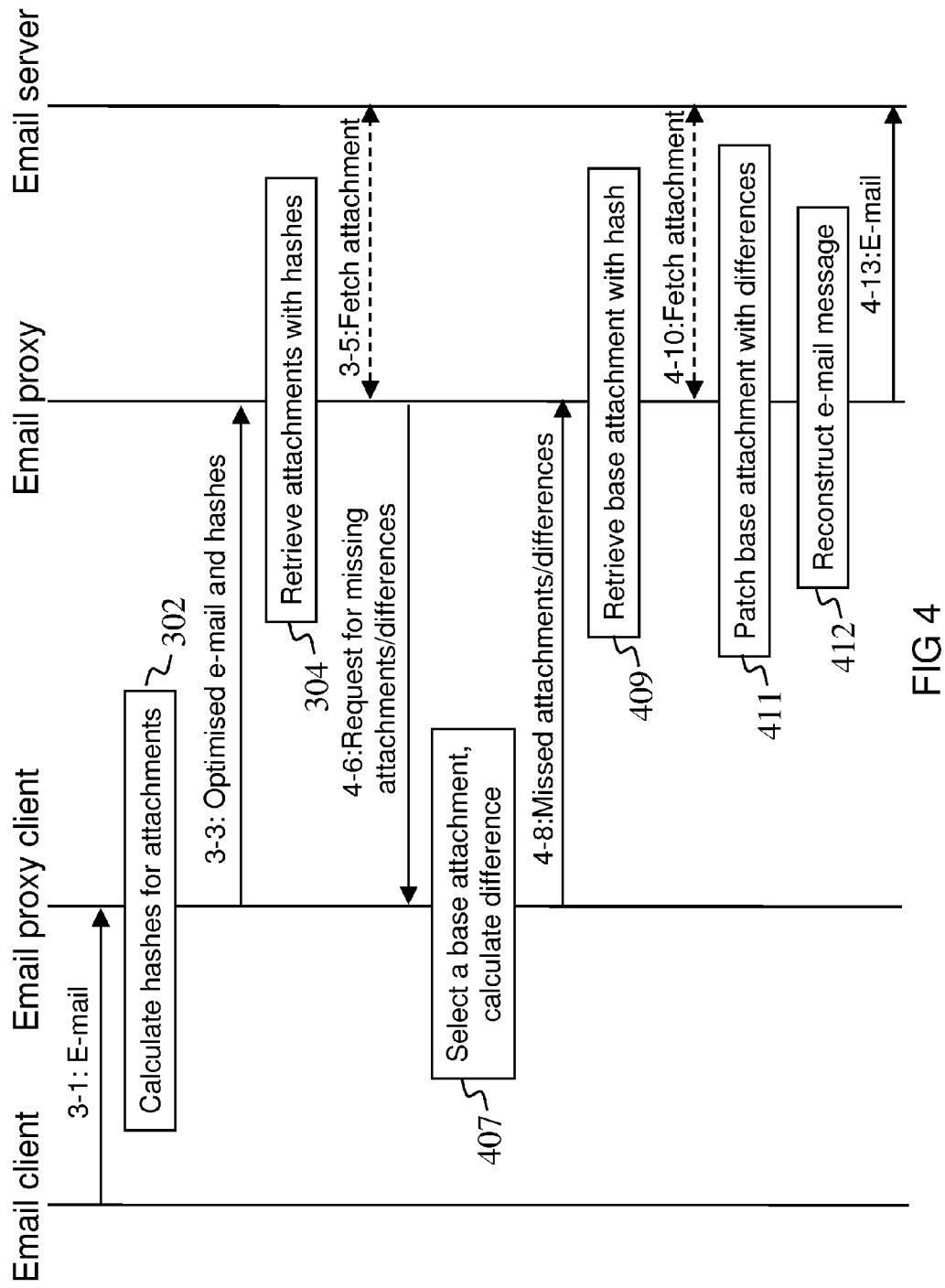
FIG. 4 shows a messaging diagram illustrating sending e-mails according to another embodiment of the invention.

FIG. 4 shows a messaging diagram illustrating sending e-mails according to another embodiment of the invention. Until the step 304 of retrieving the attachments in the e-mail proxy and the message 3-5 for fetching the attachments from the e-mail server the operation in FIG. 4 is equal to FIG. 3.

If the proxy or the e-mail server does not have the attachment, the e-mail proxy sends a request for missing attachments or differences 4-6 to the e-mail proxy client. In step 407, the e-mail proxy client selects a base attachment (based on name, type, date, size, etc.) that is presumably found in the e-mail proxy or e-mail server and calculates a bytewise difference between the base attachment and the original attachment. (This process may be executed several times in order to gain the minimum difference.)

Then, the e-mail proxy client sends the hash of the base attachment and the difference between the base attachment and the original attachment 4-8 to the e-mail proxy. In some implementation it may suffice to send only the difference. In that case the recipient may for example try to build the original attachment by combining the difference with a predefined set of files (for example files stored in cache) and see if any of the combinations results in sensible file. The e-mail proxy may also compress the difference before sending the message to the e-mail proxy client. If a suitable base attachment is not found, the e-mail proxy client may send the original attachment.

In step 409, the e-mail proxy retrieves the base attachment on the basis of the hash sent by the e-mail proxy client. (The attachment may be fetched 4-10 from the e-mail server.) Then, the base attachment is patched with the difference in order to create the original attachment in step 411. After this the original e-mail message is reconstructed on the basis of the patched attachment, in step 412, and the email proxy sends the reconstructed e-mail message 4-13 to the recipient.

Figure 5:
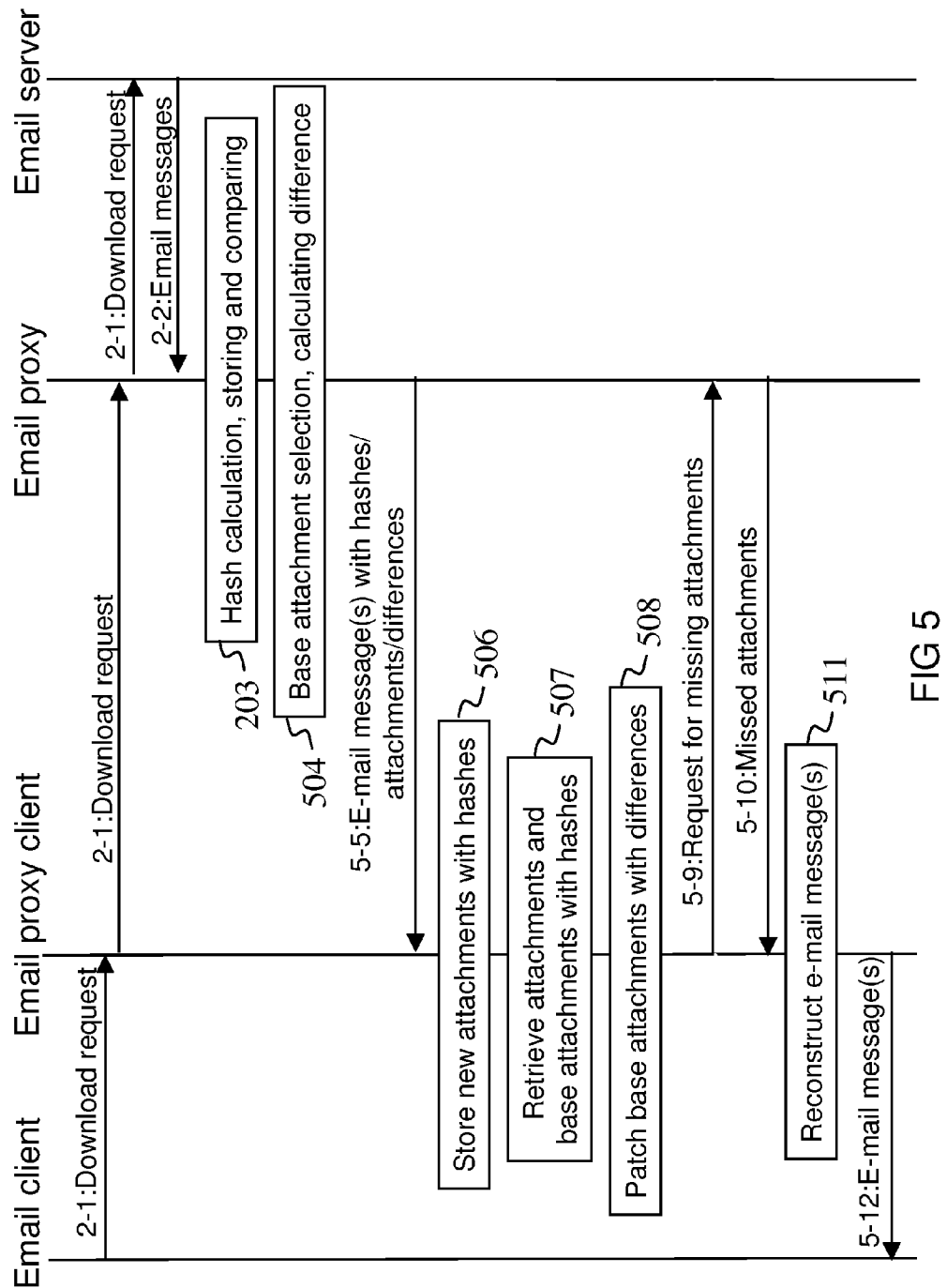
FIG. 5 shows a messaging diagram illustrating downloading e-mails according to another embodiment of the invention.

FIG. 5 shows a messaging diagram illustrating downloading e-mails according to another embodiment of the invention. Until the step 203 of calculating, storing and comparing hash values the operation in FIG. 5 is equal to FIG. 2.

If the hash of the original attachment is not found in the previous hashes, the e-mail proxy tries to find a suitable base attachment for calculating a difference between the base attachment and the original attachment in step 504. The base attachments should be such that it is available for the e-mail proxy client. If a suitable base attachment is found, the e-mail proxy calculates the difference between the base attachment and the original attachment.

Then the e-mail proxy sends the e-mail message(s) accompanied with attachments/differences and related hashes 5-5 to the email proxy client. If a difference is used, a hash value relating to the base attachment is sent to the e-mail proxy client.

In step 506, the e-mail proxy client stores new hashes (and optionally new attachments) received from the e-mail proxy. Then the e-mail proxy client retrieves the substituted attachments or base attachments on the basis of the hashes in step 507.

If the client has the attachment (original or base), it retrieves it based on the hash (from client's own store or from e-mail program's store). The base attachment is patched with the difference in order to create the original attachment in step 508.

If the client does not have the base attachment, it sends a request for the original attachments 5-9 to the e-mail proxy, which responds by sending the missing attachments 5-10.

Then the e-mail proxy client reconstructs the original e-mail message(s) on the basis of the retrieved attachments and patched base attachments in step 511. After the reconstruction the email proxy client sends the reconstructed e-mail message(s) 5-12 to the e-mail client.

It must be noted that FIGS. 2-5 illustrate only examples and that any details of one example may be combined with the details of the other examples.

Any hash algorithm that produces substantially unique hash values may be used in connection with the invention. Nevertheless, also other substantially unique identifiers may be used. For example in case of a cyclical checksum based substantially unique identifier the algorithm may work as follows: the transmitting end calculates the cyclical checksum for a file to be transferred so that first a checksum is calculated for a window of width w (w is smaller than the file size). Then the window is moved forward by a delta d and the checksum is again calculated from for a window of width w. This is continued until the end of the file and thereby a set of checksums is obtained. This set of checksums is then sent to the receiving end instead of the original file and the receiving end compares the checksums it received with cyclical checksums calculated for various files available in the receiving end. If a large number of checksums are identical for two files it may be concluded that the files are similar (or similar enough for the purposes of the embodiment of the invention).

Further, any e-mail protocol, such as POP, IMAP, SMTP and MAPI (Messaging Application Programming Interface), may be employed in connection with between an e-mail client and an e-mail proxy client, and between an e-mail proxy and an e-mail server. The protocols that are used may be different in the terminal and in the server network.

The functionality of a system according to the invention may be configurable for example based on attachment type, size, user preferences, mobile terminal processing power, network conditions, etc. Moreover, text contained in messages can be handled in the same way as the handling of attachments discussed above. The implementations employing differentiation are beneficial for example in cases where e-mail messages are replied to, forwarded or bounced.

Figure 6:
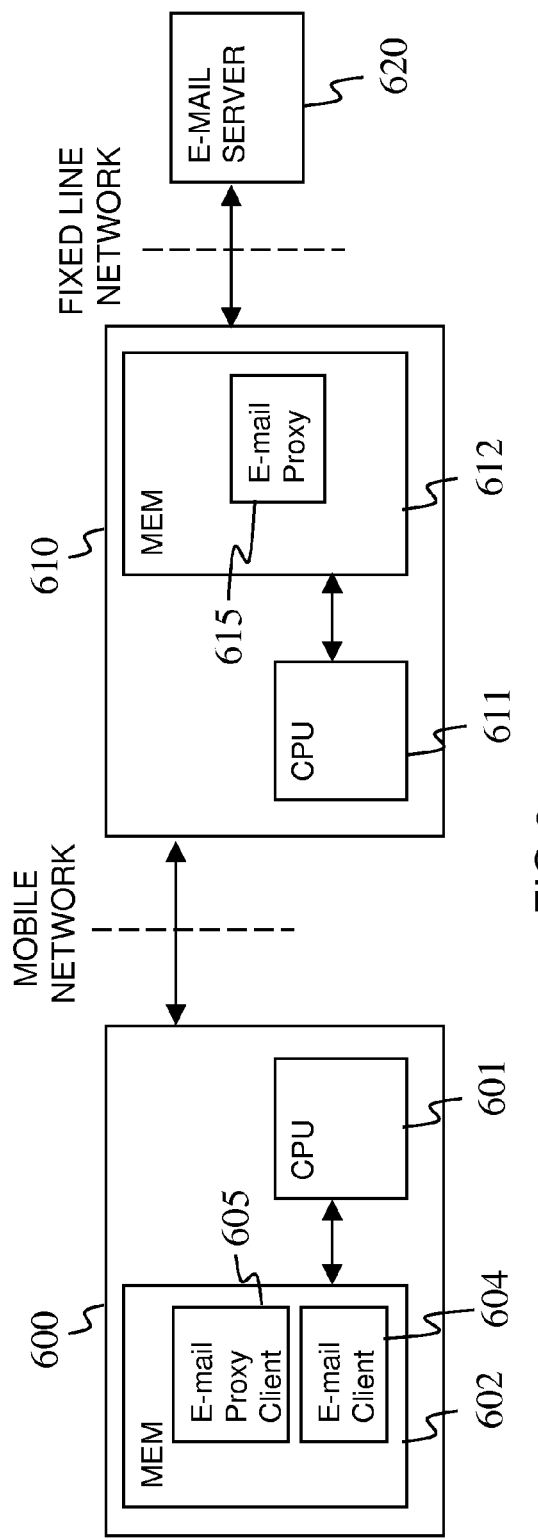
FIG. 6 shows a simplified block diagram of a system comprising a user device and a network entity according to an embodiment of the invention.

FIG. 6 shows a simplified block diagram of a system comprising a user device 600 and a network entity 610 according to an embodiment of the invention. The user device may be for example a mobile terminal or some other corresponding device and the network entity may be for example a server.

The user device 600 comprises a processing unit 601 and a memory 601 coupled to the processing unit 601. The memory comprises an e-mail client software 604 and an e-mail proxy client software 605 executable in the processing unit 601. The network entity 610 comprises a processing unit 611 and a memory 611 coupled to the processing unit 611. The memory comprises an e-mail proxy software 615 executable in the processing unit 611. The user device 600 and the network entity 610 are connected to each other at least partially over mobile network. The network entity is further connected to an e-mail server 620 over a fixed line network.

The processing unit 601 controls, in accordance with the e-mail proxy client software 605, the user device to process a message, which is generated by means of the e-mail client software 604 and which is intended to be transferred to the e-mail server 620 over the mobile network, and/or a message, which has been transferred from the network entity 610 over the mobile network.

For processing a message intended to be transferred over the mobile network the user device 600 is controlled to define a substantially unique identifier at least for one part of the message to be transferred, to conditionally replace the part of the message to be transferred with the substantially unique identifier, and to forward the message for transfer to the network entity 610 and the e-mail proxy software 615 therein.

For processing a message, which has been transferred over the mobile network, the user device 600 is controlled to identify that the message comprises a substantially unique identifier as a substitute of a part of the message and to retrieve said substituted part of the message on the basis of said substantially unique identifier.

The processing unit 611 controls, in accordance with the e-mail proxy software 615, the network entity to process a message, which is received from the e-mail server 620 and which is intended to be transferred to the user device 600 over the mobile network, and/or a message, which has been transferred from the user device 600 over the mobile network and which is destined to the e-mail server 620.

For processing a message intended to be transferred over the mobile network the network entity 610 is controlled to define a substantially unique identifier at least for one part of the message to be transferred, to conditionally replace the part of the message to be transferred with the substantially unique identifier, and to forward the message for transfer to the user device 600.

For processing a message, which has been transferred over the mobile network, the network entity 610 is controlled to identify that the message comprises a substantially unique identifier as a substitute of a part of the message and to retrieve said substituted part of the message on the basis of said substantially unique identifier. The network entity is further controlled to reconstruct the original message and to forward it to the e-mail server 620.

It must be noted that also other implementations are possible. For example, the email proxy client having functionality according to the invention may be bundled with an e-mail program for example by using an (separately installed) extension API (Application Programming Interface) or through integration. The email proxy client may be bundled also with other network related software, such as VPN clients, dialers, personal firewalls, etc.

The e-mail proxy having functionality according to the invention can be bundled with any other performance enhancing proxy, for example with an optimising HTTP proxy. Furthermore the e-mail proxy client can be bundled with any other performance enhancing proxy client. It is also possible to implement the e-mail proxy in connection with an e-mail server.

In an embodiment of the invention, the e-mail proxy (or some other network entity according to the invention) may be configured to remove a hash (or some other substantially unique identifier) from the maintained previous identifiers, if the respective attachment (or some other part of a message) is not anymore available to the e-mail proxy for example because it has disappeared from the e-mail server. Messages in the e-mail server are usually deleted through the e-mail proxy. Thus, the e-mail proxy may be set to delete a hash when respective message is deleted from the e-mail server. Nevertheless, the user may delete attachments or messages from the e-mail server also through some other interface. In order to cope with such a situation, the e-mail proxy may be set to synchronise the hashes it maintains with the data in the e-mail server for example during idle times.

The information the e-mail proxy and/or e-mail proxy client maintain in relation to the parts of previous messages may be a reference to the respective data stored into some other location. Alternatively, the e-mail proxy and/or e-mail proxy client may store copies of the attachments or other parts of messages themselves. Further, for the purposes of retrieving a substituted attachment, the e-mail proxy may be set to employ attachments stored in a plurality of e-mail boxes in the e-mail server instead of just the attachments that are stored in the e-mail box of the respective user.

The e-mail proxy may be configured to store user credentials for the users earlier or to pick them up and store them when e-mails of a particular user are retrieved. Credentials may be stored per user or per attachment.

Figure 7:
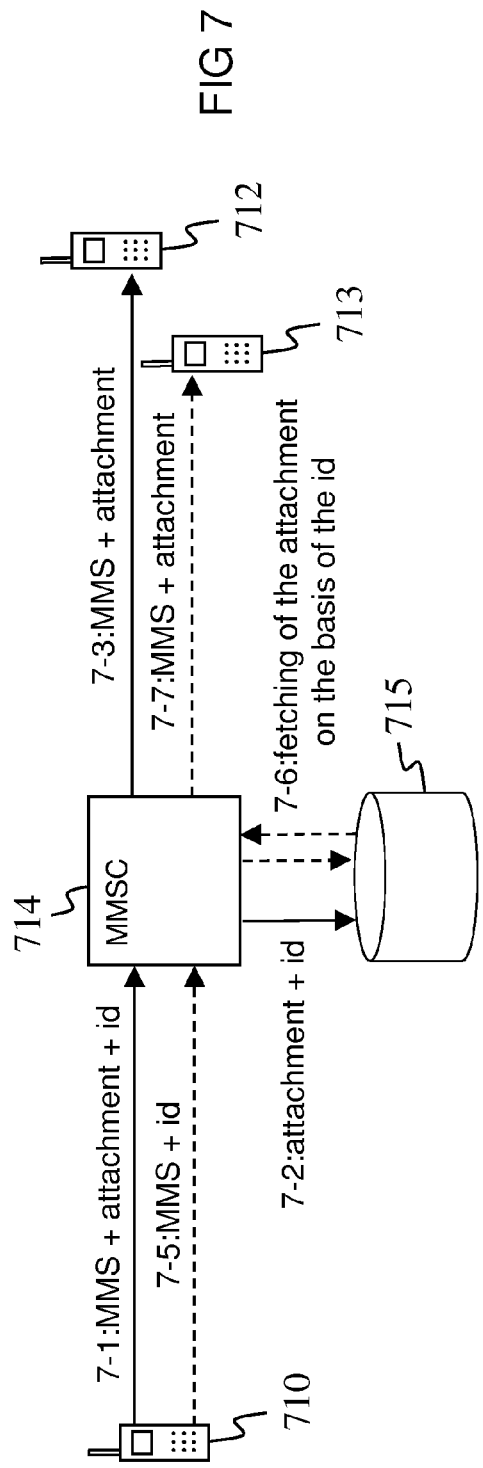
FIG. 7 shows a simplified block diagram of a system comprising a user device and a network entity according to another embodiment of the invention.

FIG. 7 shows a simplified block diagram of a system comprising a user device and a network entity according to an embodiment of the invention. In the example shown the user device is a mobile terminal 710 and the network entity is an MMSC element 714. The mobile terminal 710 communicates with the MMSC element 714 at least partially over an air interface via a base station subsystem (not shown). FIG. 7 shows also two other mobile terminals 712 and 713 that communicate with the MMSC element 714.

Furthermore, the MMSC element is connected to a database 715. The database may be integral part of the MMSC element, such as the storage in which the MMSC temporarily stores MMS messages that are transferred between transmitting and receiving mobile terminals. (As is well known to persons skilled in the art the operation of the MMSC is based on a store-and-forward principle.) Alternatively, the database 715 may be a separate element.

Now, according to an embodiment of the invention, the mobile terminal 710 first sends an MMS message including an attachment, such as a photograph, to the mobile terminal 712. To accomplish this, the mobile terminal 710 sends to the MMSC an MMS message 7-1 comprising the attachment and an id, which is a substantially unique identifier of the attachment. MMSC element stores the attachment 7-2 together with the id into the database 715 and forwards the MMS message 7-3 including the attachment to the recipient mobile terminal 712.

Then, the mobile terminal 710 sends another MMS message to the mobile terminal 713. This MMS message includes the same attachment as the MMS message 7-1 sent to the mobile terminal 712. Now, the mobile terminal 710 is controlled to notice that attachment has already been sent to the MMSC element. Therefore the mobile terminal 710 sends to the MMSC_element an MMS message 7-5, wherein the attachment has been replaced by the respective id. MMSC element then retrieves the attachment 7-6 from the database 715 on the basis of the id and forwards the MMS message 7-7 including the attachment to the recipient mobile terminal 713.

This example suits well for example to situations in which a user sends the same MMS message to multiple recipients. By means of the implementation discussed above, the attachments needs to be sent to the MMSC element only once even though multiple messages comprising the attachment are transferred though the MMSC element.

It must be noted that this is only one example of an MMS implementation and that other options are possible. For example, optimisation between the message transmission from the MMSC element to the recipient mobile terminals 712 and 713 is also possible.

Particular implementations and embodiments of the invention have been described especially in connection to e-mail implementations. It is clear to a person skilled in the art that the invention is not restricted to details of the embodiments presented above, but that it can be implemented in other embodiments using equivalent means without deviating from the characteristics of the invention. Thereby, for example the details described in connection with e-mail messages can be employed also in connection with any other suitable messages such as MMS messages or messages comprising Java content. The scope of the invention is only restricted by the attached patent claims.

The invention claimed is:

1. A method for processing messages to be transferred from a transmitting entity to a receiving entity over a communication network, the method comprising the steps of:
at the transmitting entity
obtaining from a sender's email client a multipart message containing text and attachments, addressed to a recipient;
defining a substantially unique identifier for an attachment;
comparing the substantially unique identifier to the identifiers previously stored in a memory,
concluding that the attachment has not been previously transferred to the receiving entity when the substantially unique identifier is missing in the identifiers stored,
selecting a base attachment with the related identifier which are known to be available for the receiving entity,
calculating a difference between the attachment and the base attachment,
replacing said attachment with said base attachment-related identifier and the difference, and;
forwarding the message for transfer to the receiving entity,
at the receiving entity
responsive to the message with said substantially identifier and the difference being attached thereto:
retrieving from a memory the base attachment on the basis of said base attachment-related identifier,
creating the attachment by combining said difference with the base attachment
reconstructing the original multipart message by replacing the identifier and the difference with the attachment to the message received,
sending the reconstructed original multipart message to the recipient.

2. The method according to claim 1, wherein the method further comprises the step of
maintaining previous identifiers obtained for attachments of previous multipart messages transmitted to and associated with said receiving entity and information about the attachments of the previous multipart messages.

3. The method according to claim 1, the method further comprising the step of
selecting data, which is at least partially similar with said attachment of the multipart message, to be used as the base attachment.

4. The method according to claim 3, wherein said selection of the data is targeted to data stored in a cache.

5. The method according to claim 2, wherein said information about the attachments of the previous multipart messages comprises references to said attachments stored in a memory.

6. The method according to claim 2, wherein said information about the attachments of the previous multipart messages comprises said attachments.

7. The method according to claim 1, wherein said multipart message is one of the following: an e-mail, an MMS (Multimedia Messaging Service) message, a mobile Java game, or another downloadable content.

8. The method according to claim 1, wherein, at the receiving entity, said step of retrieving the base attachment comprises a sub-step of
requesting said attachment of the multipart message from the transmitting entity when said base attachment-related identifier is missing from said previous identifiers.

9. The method according to claim 1, wherein said information about the attachments of the previous multipart messages comprises: said attachments or references to said attachments stored in a memory.

10. The method according to claim 1, wherein the substantially unique identifier is one of the following: a hash value, a cyclical checksum, a difference between the attachment, a base attachment.

* * * * *